United States Patent
Shi (10) Patent No.: US 11,683,834 B2
(45) Date of Patent: Jun. 20, 2023

(54) SIGNAL TRANSMISSION METHOD, COMMUNICATION DEVICE AND STORAGE MEDIUM

(71) Applicant: GUANGDONG OPPO MOBILE TELECOMMUNICATIONS CORP., LTD., Guangdong (CN)

(72) Inventor: Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 10 days.

(21) Appl. No.: 17/078,738

(22) Filed: Oct. 23, 2020

(65) Prior Publication Data

US 2021/0045155 A1 Feb. 11, 2021

Related U.S. Application Data

(63) Continuation of application No. PCT/CN2018/084472, filed on Apr. 25, 2018.

(51) Int. Cl.
*H04W 72/04* (2023.01)
*H04W 74/08* (2009.01)

(52) U.S. Cl.
CPC ............... *H04W 74/0808* (2013.01)

(58) Field of Classification Search
CPC ........ H04L 27/26; H04L 27/28; H04W 16/04; H04W 16/14; H04W 72/0446; H04W 72/0453; H04W 74/08; H04W 74/0808
See application file for complete search history.

(56) References Cited

U.S. PATENT DOCUMENTS 8,804,609 B2 * 8/2014 Zhang ................. H04L 27/2602
370/328
9,847,962 B2 * 12/2017 Liu ......................... H04L 51/30
(Continued)

FOREIGN PATENT DOCUMENTS

CN 105636231 A 6/2016
CN 107438966 A 12/2017
(Continued)

OTHER PUBLICATIONS

Supplementary European Search Report in the European application No. 18916353.8, dated Mar. 30, 2021.
(Continued)

*Primary Examiner* — Alpus Hsu
(74) *Attorney, Agent, or Firm* — Ladas & Parry LLP (57) ABSTRACT

A signal transmission method, a communication device and a storage medium are provided. The signal transmission method includes operations as follows. A channel detection window and a signal transmission window are determined. The channel detection window is located before the signal transmission window, the channel detection window comprises N sub-detection windows, the signal transmission window comprises M sub-transmission resources, a first sub-detection window in the N sub-detection windows corresponds to a first sub-transmission resource in the M sub-transmission resources, N is greater than or equal to 2, and M is greater than or equal to 2. Channel detection is performed in the first sub-detection window. If a channel detection result in the first sub-detection window indicates that a channel is idle, a target signal is transmitted in the first sub-transmission resource.

18 Claims, 3 Drawing Sheets

(56) References Cited

U.S. PATENT DOCUMENTS

| | | | |
|---|---|---|---|
| 9,923,679 B2* | 3/2018 | Huang | H04W 74/0808 |
| 10,142,079 B2* | 11/2018 | Oh | H04L 5/0055 |
| 2009/0067448 A1 | 3/2009 | Stanwood | |
| 2011/0249627 A1 | 10/2011 | Stanwood et al. | |
| 2017/0019924 A1* | 1/2017 | Wang | H04L 5/0092 |
| 2017/0339719 A1 | 11/2017 | Xu et al. | |
| 2018/0062807 A1 | 3/2018 | Seo et al. | |
| 2018/0091242 A1* | 3/2018 | Li | H04W 72/0446 |
| 2019/0059106 A1* | 2/2019 | Zhang | H04W 16/14 |
| 2019/0191411 A1* | 6/2019 | Petersson | H04W 72/082 |
| 2019/0200389 A1 | 6/2019 | Li et al. | |
| 2019/0313405 A1* | 10/2019 | Li | H04W 24/08 |
| 2019/0373635 A1* | 12/2019 | Yang | H04W 74/0808 |
| 2019/0387377 A1* | 12/2019 | Zhang | H04W 4/44 |
| 2020/0029245 A1* | 1/2020 | Khoryaev | H04W 4/46 |
| 2020/0275411 A1* | 8/2020 | Tang | H04W 72/02 |
| 2020/0314906 A1* | 10/2020 | Goyal | H04B 7/0695 |
| 2020/0374709 A1 | 11/2020 | Chen | |

FOREIGN PATENT DOCUMENTS

| | | |
|---|---|---|
| CN | 107566149 A | 1/2018 |
| EP | 3751946 A1 | 12/2020 |
| EP | 3930392 A1 | 12/2021 |
| WO | 2018062966 A1 | 4/2018 |

OTHER PUBLICATIONS

Interdigital Inc: "On LBT for Beam-Based Transmission for NR-U", 3GPP Draft; R1-1804885 On LBT for Beam-Based Transmission for NR-U, 3rd Generation Partnership Project (GPP), Mobile Competence Centre; 650, Route Des Lucioles; F-06921 Sophia-Antipolis Cedex; FRA vol.RAN WG1, No. Sanya, China; Apr. 16, 2018-Apr. 20, 2018, Apr. 15, 2018 (Apr. 15, 2018).

International Search Report in the international application No. PCT/CN2018/084472, dated Jan. 23, 2019.

Written Opinion of the International Search Authority in the international application No. PCT/CN2018/084472, dated Jan. 23, 2019.

Nokia, Nokia Shanghai Bell, "Potential solutions and techniques for NR unlicensed", 3GPP TSG RAN WG1 Meeting #92, R1-1802526, Athens, Greece, Feb. 26-Mar. 2, 2018, 11 pages.

First Office Action of the European application No. 18916353.8, dated Feb. 6, 2023.

* cited by examiner

SIGNAL TRANSMISSION METHOD, COMMUNICATION DEVICE AND STORAGE MEDIUM

CROSS-REFERENCE TO RELATED APPLICATIONS

This is a continuation application of International Patent Application No. PCT/CN2018/084472, filed on Apr. 25, 2018, the disclosure of which is hereby incorporated by reference in its entirety.

BACKGROUND

A New Radio (NR) system supports data transmission on unlicensed frequency bands. Communication of the communication device on unlicensed frequency bands should be based on the principle of Listen Before Talk (LBT), that is, the communication device needs to perform channel detection (or channel sensing) before transmitting signals on the channels of the unlicensed frequency spectrum. Only when a result of the channel detection indicates that the channel is idle, the communication device can transmit a signal. If the result of the channel detection on the unlicensed frequency spectrum by the communication device indicates that the channel is occupied (that is, the channel is busy), the communication device cannot transmits a signal.

When multiple signals are required to be transmitted continuously, there is no time interval for channel detection between the multiple signals, or the time interval is not sufficient to perform channel detection. In this case, how to perform channel detection of multiple continuous signals to be transmitted has become an urgent problem to be solved.

SUMMARY

The embodiments of the disclosure relate to the field of wireless communication, and more specifically to a method for signal transmission, a communication device and a storage medium.

A first aspect of the embodiments of the disclosure provides a method for signal transmission, which may include operations as follows. A channel detection window and a signal transmission window are determined, and the channel detection window is located before the signal transmission window in the time domain. The channel detection window includes N sub-detection windows, and the signal transmission window includes M sub-transmission resources. A first sub-detection window of the N sub-detection windows corresponds to a first sub-transmission resource of the M sub-transmission resources. N and M are positive integers, and N≥2, M≥2. Channel detection is performed in the first sub-detection window, and in response to that a result of the channel detection in the first sub-detection window indicates that the channel is idle, a target signal is transmitted in the first sub-transmission resource.

A second aspect of the embodiments of the disclosure provides a communication device, which includes a processor and a memory. The memory is used to store a computer program, and the processor is used to call and run the computer program stored in the memory, to execute operations as follows. A channel detection window and a signal transmission window are determined, and the channel detection window is located before the signal transmission window in the time domain. The channel detection window includes N sub-detection windows, and the signal transmission window includes M sub-transmission resources. A first sub-detection window of the N sub-detection windows corresponds to a first sub-transmission resource of the M sub-transmission resources. N and M are positive integers, and N≥2, M≥2. Channel detection is performed in the first sub-detection window, and in response to that a result of the channel detection in the first sub-detection window indicates that the channel is idle, a target signal is transmitted in the first sub-transmission resource.

A third aspect of the embodiments of the disclosure provides a computer-readable storage medium for storing a computer program that enables a computer to perform the method in the first aspect.

DETAILED DESCRIPTION

The technical solutions of the embodiments of the disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long term evolution (LTE-A) system, a New Radio (NR) system, a NR system evolution system, a LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, a Wireless Local Area Networks (WLAN), a Wireless Fidelity (WiFi), a next-generation communication systems or other communication systems, etc.

Generally, traditional communication systems support a limited number of connections and are easy to be implemented. However, with the development of communication technology, mobile communication systems will not only support traditional communication, but also support, for example, device to device (D2D) communication, machine to machine (M2M) communication, machine type Communication (MTC), and vehicle to vehicle (V2V) communication, etc. The embodiments of the disclosure can also be applied to these communication systems.

Optionally, the communication system in the embodiment of the disclosure may be applied to a carrier aggregation (CA) scenario, a dual connectivity (DC) scenario, or a standalone (SA) configuration scenario.

The embodiments of the disclosure do not limit the applied frequency spectrum. For example, the embodiments of the disclosure may be applied to a licensed spectrum or an unlicensed spectrum.

Figure 1:
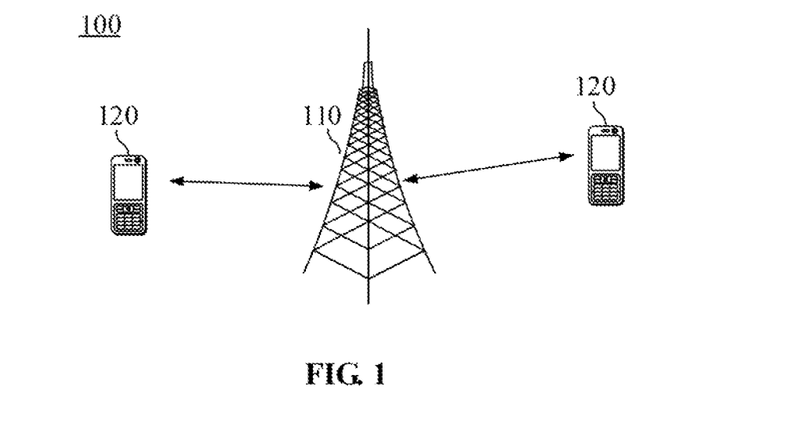
FIG. 1 is a schematic diagram of a possible wireless communication system to which an embodiment of the disclosure is applied.

FIG. 1 shows a possible wireless communication system 100 to which the embodiments of the disclosure are applied. The wireless communication system 100 may include a network device 110. The network device 110 may be a device that communicates with a terminal device. The network device 110 can provide communication coverage for a specific geographic area, and can communicate with terminal devices located within the coverage. Optionally, the network device 100 may be a base transceiver station (BTS) in a GSM system or a CDMA system, or a NodeB (NB) in a WCDMA system, or an evolutional Node B (eNB or eNodeB) in an LTE system, or a network-side device in the NR system, or a wireless controller in the cloud radio access network (CRAN). Alternatively, the network device can be a relay station, an access point, an in-vehicle device, a wearable device, a network-side device in next-generation networks, or a network device in a future evolution public land mobile networks (PLMN).

The wireless communication system 100 further includes at least one terminal device 120 located within the coverage of the network device 110. The terminal device 120 may be mobile or fixed. Alternatively, the terminal device 120 may refer to an access terminal, a user equipment (UE), a user unit, a user station, a mobile station, a mobile terminal, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital processing (PDA), or a handheld device having a wireless communication function, a computing device or other processing device connected to a wireless modem, an in-vehicle device, a wearable device, a terminal device in the future 5G network or a terminal device in future evolved PLMNs or the like. Optionally, device to device (D2D) communication may also be performed between the terminal devices 120.

Specifically, the network device 110 may provide a service for the cell, and the terminal device 120 communicates with the network device 110 through transmission resources (for example, frequency domain resources or frequency spectrum resources) used by the cell, and the cell may be a cell corresponding to the network device 110 (for example, the base station). The cell may belong to a macro base station or a base station corresponding to a small cell. The small cell here may include: a metro cell, a micro cell, a pico cell and a femto cell or the like. These small cells have the characteristics of small coverage and low transmission power, and are applicable for providing high-speed data transmission services.

FIG. 1 exemplarily shows one network device and two terminal devices. Optionally, the wireless communication system 100 may include multiple network devices and each network device may include terminal devices within the coverage, the number of which is other than two, which is not limited in the embodiments of the disclosure.

Optionally, the wireless communication system 100 may further include other network entities such as a network controller and a mobility management entity, which is not limited in the embodiments of the disclosure.

Optionally, the downlink physical channel in the embodiments of the disclosure may include a physical downlink control channel (PDCCH), an enhanced physical downlink control channel (EPDCCH), a physical downlink shared channel (PDSCH), a physical Hybrid ARQ Indicator Channel (PHICH), a physical multicast channel (PMCH), a physical broadcast channel (PBCH), or the like. The downlink reference signal may include a downlink synchronization signal, a phase tracking reference signal (PT-RS), a downlink DeModulation reference signal (DMRS), and a channel state information reference signal (CSI-RS) or the like. The downlink synchronization signal may be used for a communication device access network and radio resource management measurement, the downlink DMRS may be used for demodulation of a downlink channel, the CSI-RS may be used for measurement of the downlink channel, downlink time-frequency synchronization or phase tracking, and the PT-RS may be used for measurement of the downlink channel, downlink time-frequency synchronization or phase tracking.

Optionally, the uplink physical channel in the embodiment of the disclosure may include a physical random access channel (PRACH), a physical uplink control channel (PUCCH), and a physical uplink shared channel (PUSCH) or the like. The uplink reference signal may include an uplink DeModulation reference signal (DMRS), a sounding reference signal (SRS), a phase tracking reference signal (PT-RS) or the like. The uplink DMRS may be used for demodulation of an uplink channel, the SRS may be used for measurement of the uplink channel, uplink time-frequency synchronization or phase tracking, and the PT-RS may also be used for measurement of the uplink channel, uplink time-frequency synchronization or phase tracking.

It should be understood that the embodiments of the disclosure may include physical channels or reference signals with the same names and different functions as those described above, and may also include physical channels or reference signals with different names and the same functions as those described above, which is not limited in the disclosure.

During transmission of downlink signals in the Licensed Assisted Access-LTE (LAA-LTE) system, the network device needs to transmit a discovery reference signal (DRS) on the unlicensed frequency spectrum, so that the terminal device of the local cell can implement synchronization with the cell on the unlicensed frequency spectrum, and the terminal device of the neighboring cell can implement measurement, such as the reference signal receiving power (RSRP) or reference signal receiving quality (RSRQ), of the radio resource management (RRM) of the signal of the local cell. The DRS in the LTE system may include a primary synchronization signal (PSS), a secondary synchronization signal (SSS) and a cell-specific reference signal (CRS). Optionally, the DRS may further include a Channel State Information Reference Signal (CSI-RS). Taking the DRS including PSS, SSS and CRS as an example, the transmission of the DRS in the LAA-LTE system is illustrated. On the unlicensed frequency spectrum, after the network device performs channel detection based on the LBT principle and obtains the channel usage right, the DRS is transmitted in a discovery signal measurement timing configuration (DMTC) window configured by the network device for the terminal device.

Figure 2:
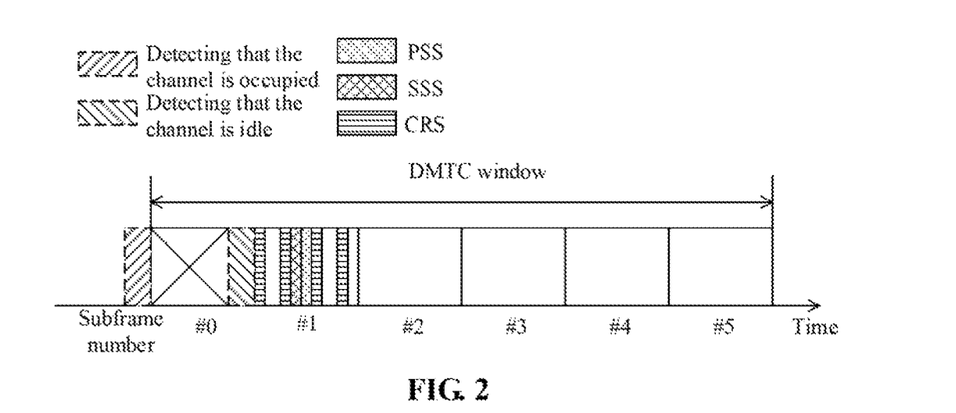
FIG. 2 is a schematic diagram of DRS transmission in a communication system.

As shown in FIG. 2, if a DRS is transmitted separately, that is, if DRS is not transmitted with a channel such as a PDSCH, a PDCCH or an EPDCCH, the network device performs a clear channel assessment (CCA) detection with the length $T_{des}$ on the unlicensed frequency spectrum before the starting of the DMTC window. If a result of the detection indicates that the channel is idle, the LBT is considered to be successful, and if the result of the detection indicates that the channel is occupied, the LBT is considered to be failed. Specifically, channel detection may refer to collecting signal energy on a channel in a time slot. If the energy value is greater than or equal to a preset threshold, the channel is considered to be occupied, and if the energy value is less than the preset threshold, the channel is considered to be idle. If the LBT fails, the network device may perform CCA detection of length of $T_{des}$ before the next subframe in the DMTC window, and may transmit a DRS signal on the first subframe where the LBT succeeds in the DMTC window. When a DRS is transmitted on a subframe, the DRS occupies the first 12 symbols of the subframe, the PSS and the SSS occupy symbol 6 and symbol 5, and the CRS occupies symbol 0, symbol 4, symbol 7 and symbol 11.

Figure 3:
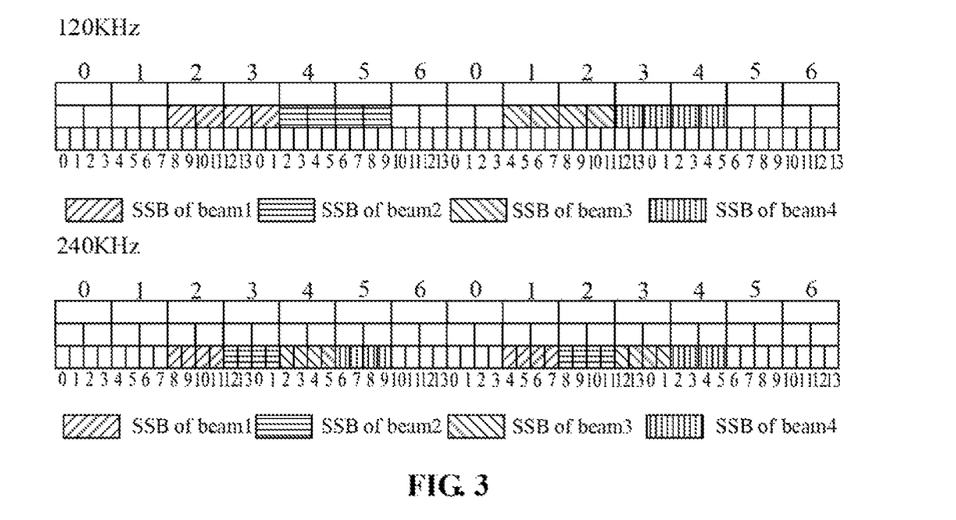
FIG. 3 is a schematic diagram of SSB transmission in a communication system.

When the NR technology is applied to the unlicensed frequency spectrum, similar to the LAA-LTE system, a synchronization signal block (SSB or SS Block) similar to the DRS in the LAA-LTE system needs to be transmitted on the unlicensed carrier. Unlike omnidirectional transmission of the DRS, the network device may transmit the SSB in different directions, or may transmit the SSB using different beams (each beam corresponds to a direction, which may also be referred to a beam direction). Correspondingly, before transmitting the SSB using one beam, a channel in the beam direction needs to be detected to ensure that the channel in the direction is available. However, in some scenarios (such as high-frequency scenarios), there may be no time interval between two adjacent SSBs or the time interval is not large enough to implement channel detection. FIG. 3 shows a schematic diagram of candidate transmission positions of an SSB in cases that the subcarrier spacing is 120 KHz and 240 KHz.

In one possible implementation method, the network device directly transmits a signal without performing channel detection, and determines whether to perform next channel detection, that is, Listen After Talk (IAT), according to a situation of a signal sent by the network device and received by the terminal device. In this method, since the terminal device needs to wait for feedback of the terminal device, to determine whether to perform channel detection, the feedback delay is large.

In an embodiment of the disclosure, a channel detection window including multiple sub-detection windows are set, the multiple sub-detection windows are used to perform channel detection on multiple signals to be transmitted. The communication device transmits the multiple signals on corresponding sub-transmission resources in the signal transmission window after the channel detection window based on a result of the detection, thereby ensuring effective transmission of high-priority signals on the premise of ensuring fairly using spectrum resources by the communication systems on the unlicensed frequency spectrum.

Figure 4:
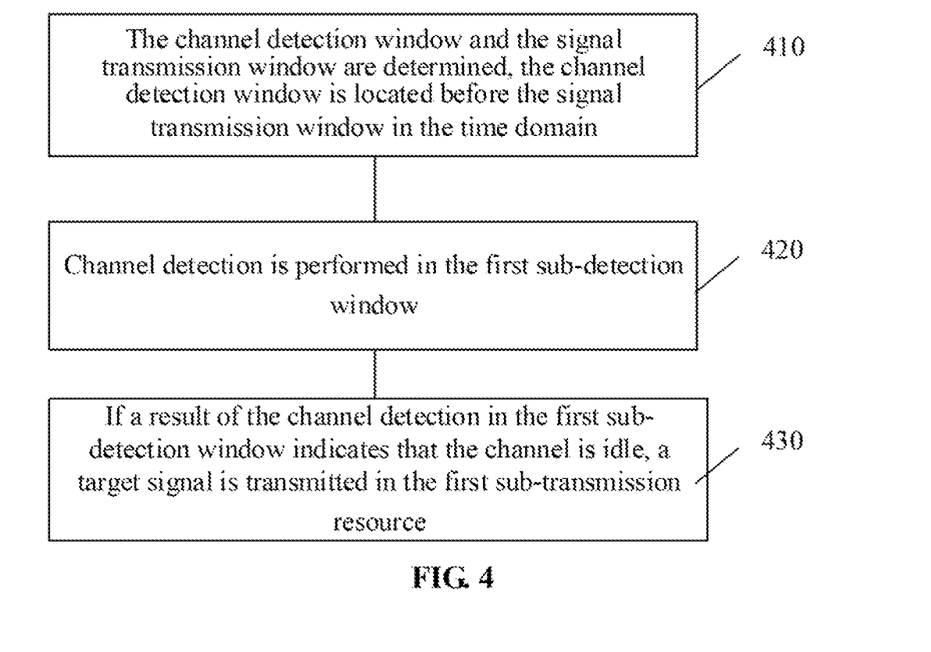
FIG. 4 is a schematic flowchart of a method for signal transmission according to an embodiment of the disclosure.

FIG. 4 is a schematic flowchart of a method 400 for signal transmission according to an embodiment of the disclosure. The method described in FIG. 4 may be performed by a communication device such as a network device or a terminal device. The terminal device may be, for example, the terminal device 120 shown in FIG. 1, and the network device may be, for example, the network device 110 shown in FIG. 1. As shown in FIG. 4, the method 400 for signal transmission may include a part or all of the following operations.

At 410, a channel detection window and a signal transmission window are determined, and the channel detection window is located before the signal transmission window in the time domain.

The channel detection window includes N sub-detection windows, and the signal transmission window includes M sub-transmission resources. A first sub-detection window in the N sub-detection windows corresponds to a first sub-transmission resource in the M sub-transmission resources, N and M are positive integers, and N≥2, M≥2.

At 420, channel detection is performed within the first sub-detection window.

At 430, if a result of the channel detection in the first sub-detection window indicates that the channel is idle, a target signal is transmitted in the first sub-transmission resource.

Specifically, the communication device performs channel detection in the signal detection window, and performs signal transmission in the signal transmission window after the channel detection window based on the result of the channel detection. The channel detection window includes N sub-detection windows (N≥2), and the signal transmission window includes M sub-transmission resources (M≥2), M=N or M≠N. There are correspondences between the N sub-detection windows and the M sub-transmission resources. For example, there are one-to-one correspondences between the N sub-detection windows and the M sub-transmission resources, or one sub-detection window corresponds to one or more sub-transmission resources, or one sub-transmission resource corresponds to one or more sub-detection windows, which is not limited in this embodiment of the disclosure. Assumed that the first sub-detection window of the N sub-detection windows corresponds to the first sub-transmission resource of the M sub-transmission resources, after the communication device performs channel detection in the first sub-detection window, the communication device may transmit a target signal in the first sub-transmission resource if a result of the channel detection in the first sub detection window indicates that the channel is idle. In practical, optionally, if a result of the channel detection in the first sub-detection window indicates that the channel is occupied, the communication device does not transmit a target signal in the first sub-transmission resource.

Therefore, the channel detection window includes multiple sub-detection windows for respectively performing channel detection on multiple signals to be transmitted, and the communication device transmits multiple signals in the corresponding sub-transmission resources in the signal transmission window after the channel detection window based on the result of the detection, thereby ensuring effective transmission of high-priority signals on the premise of ensuring fairly using spectrum resources by the communication systems on the unlicensed frequency spectrum.

It can be seen that even when there is no time interval for channel detection between the transmission resources used by the multiple signals to be transmitted or the time interval is not enough to perform channel detection, the method described in the embodiments of the disclosure can still effectively realize effective channel detection for multiple consecutive signals.

Optionally, the communication device is a network device or a terminal device.

Optionally, M=N, the first sub-detection window is an i-th sub-detection window of the N sub-detection windows arranged in chronological order, and the first sub-transmission resource is an i-th sub-transmission resource of the M sub-transmission resources arranged in chronological order, i is a positive integer, and 1≤i≤N.

Alternatively, optionally, M=N, the first sub-detection window is an i-th sub-detection window of the N sub-detection windows arranged in chronological order, and the first sub-transmission resource is an i-th sub-transmission resource of the M sub-transmissions resources arranged in chronological order, i is a positive integer and 1≤i≤N.

In this embodiment, M=N, N sub-detection windows and M sub-transmission resources have one-to-one correspondences in chronological order. Specifically, the N sub-detection windows may be arranged in chronological order (the first sub-detection window to the N-th sub-detection window are sequentially arranged in chronological order), and the M sub-transmission resources are arranged in chronological order (the first sub-transmission resource to the M-th sub-transmission resource are arranged sequentially in chronological order). The first sub-detection window corresponds to the first sub-transmission resource, the second sub-detection window corresponds to the second sub-transmission resource, . . . , the i-th sub-detection window corresponds to the i-th sub-transmission resource, . . . , the N-th sub-transmission window corresponds to the M-th sub-transmission resource. Alternatively, the first sub-detection window corresponds to the M-th sub-transmission resource, the second sub-detection window corresponds to the (M−1)-th sub-transmission resource, . . . , the i-th sub-detection window corresponds to the (M−i+1)-th sub-transmission resource, . . . the Nth sub-detection window corresponds to the first sub-transmission resource.

In practical, only two optional solutions are provided here, and the embodiments of the disclosure are not limited thereto. There may be other correspondences between the N sub-detection windows and the M sub-transmission resources. For example, in a case of M=N, the first sub-detection window is an i-th sub-detection window of the N sub-detection windows arranged in order of window size from large to small (or from small to large), and the first sub-transmission resource is an i-th sub-transmission resource of the M sub-transmission resources arranged in chronological order (or in reverse chronological order).

Optionally, the N sub-detection windows are continuous in the time domain.

Optionally, the N sub-detection windows further include a second sub-detection window adjacent to the first sub-detection window, and a relationship between the first sub-detection window and the second sub-detection window in the time domain may be continuous or discontinuous or partially overlapping.

Optionally, the M sub-transmission resources further include a second sub-transmission resource adjacent to the first sub-transmission resource, and the first sub-transmission resource and the second sub-transmission resource are continuous or discontinuous in the time domain.

Optionally, the M sub-transmission resources further include a second sub-transmission resource adjacent to the first sub-transmission resource, and the first sub-transmission resource and the second sub-transmission resource partially overlap in the time domain.

Optionally, the first sub-transmission resource and the second sub-transmission resource are discontinuous in the time domain, and the second sub-transmission resource is located before the first sub-transmission resource in the time domain, the method may further include an operation that a padding signal is transmitted in a time interval between the second sub-transmission resource and the first sub-transmission resource. The padding signal and the target signal use the same precoding.

By way of example but not limitation, the padding signal and the target signal using the same precoding includes the padding signal and the target signal using the same analog precoding (or using the same beam direction), and/or the padding signal and the target signal using the same digital precoding (or the same precoding matrix).

By way of example but not limitation, the padding signal and the target signal using the same precoding includes the padding signal and the target signal using the precoding as an identity matrix, or in other words, the padding signal and the target signal using no precoding.

Optionally, at 420, the operation that channel detection is performed in the first sub-detection window includes an operation that channel detection is performed on a channel in the first direction in the first sub-detection window.

It should be understood that, in the embodiment of the disclosure, the communication device performs channel detection on the channel in the first direction to match signal transmission of the communication device in the first direction. Therefore, channel detection of the communication device on the channel in the first direction includes a channel detection technology that enables the communication device to determine whether the channel in the direction is idle.

As an example but not a limitation, the communication device collects signal energy in the first direction, and determines whether the channel in the first direction is idle according to whether the signal energy in the direction exceeds a preset threshold.

As an example but not a limitation, the communication device receives indication information sent by a target signal receiving device to indicate whether the channel in the first direction is idle, and determines whether the channel in the first direction is idle according to the indication information.

Optionally, the target signal receiving device performs channel detection on the channel in the first direction (for example, the target signal receiving device collects signal energy in the first direction, and determines a result of the channel detection in the first direction according to whether the signal energy in the direction exceeds a preset threshold), and transmits the result of the channel detection to the communication device in the first sub-detection window, the communication device receives the result of the channel detection in the first sub-detection window, and determines whether the channel in the first direction is idle based on the result of the channel detection, thereby performing channel detection on the channel in the first direction within the first sub-detection window.

At 430, in response to that the result of the channel detection in the first sub-detection window indicates that the channel is idle, a target signal is transmitted in the first sub-transmission resource includes an operation as follows. In response to that the result of the channel detection on the channel in the first direction within the first sub-detection window indicates that the channel is idle, a target signal is transmitted in the first sub-transmission resource in the first direction.

Specifically, the N sub-detection windows may be used to perform channel detection on channels in different directions. For example, the first sub-detection window is used to perform channel detection on a channel in one direction (for example, the first direction). In response to that the result of the channel detection on the channel in the first direction in the first sub-detection window indicates that the channel is idle, the target signal may be transmitted on the first sub-transmission resource corresponding to the first sub-detection window in the first direction. In practical, optionally, in response to that the result of the channel detection on the channel in the first direction in the first sub-detection window indicates that the channel is occupied, no target signal is transmitted in the first direction on the first sub-transmission resource.

For another example, the first sub-detection window is used to perform channel detection on channels in at least two directions (for example, a second direction and a third direction). If each of the results of the channel detection on the channels in the second direction and the third direction in the first sub-detection window indicates that the channel is idle, the communication device transmits a target signal in at least one of the second and third directions in the first sub-detection window. If the result of the channel detection on the channel in one of the second direction and the third direction in the first sub-detection window indicates that the channel is idle, the communication device transmits a target signal in the first sub-transmission resource in the direction in which the channel is idle. If the results of the channel detection on the channels in the second direction and the third direction in the first sub-detection window indicate that both the channels are occupied, no target signal is transmitted in the second direction and the third direction on the first sub-transmission resource.

In the embodiment of the disclosure, the target signal may be, for example, at least one of an SSB, a CSI-RS, an SRS and other signals. Alternatively, the target signal may be transmitted in at least two directions, or the target signal may be transmitted by using at least two beams.

In the embodiment of the disclosure, when the target signal is an SSB, the target signal includes a PSS and an SSS. Optionally, the target signal may further include one or more of a PBCH, a CRS, and a CSI-RS.

In the embodiment of the disclosure, since a signal detection window including multiple sub-detection windows is provided, channel detection may be performed on the channels to be transmitted in multiple directions in the multiple sub-detection windows, the communication device may transmit a target signal such as an SSB in a corresponding direction on a sub-transmission resource corresponding to a sub-detection window in which a result of the channel detection indicates that the channel is idle based on the result of the channel detection, thereby ensuring that channel detection can be performed before each SSB is transmitted, and ensuring transmission of a high-priority SSB on the premise of ensuring fairly using spectrum resources by the communication systems on the unlicensed frequency spectrum.

Figure 5:
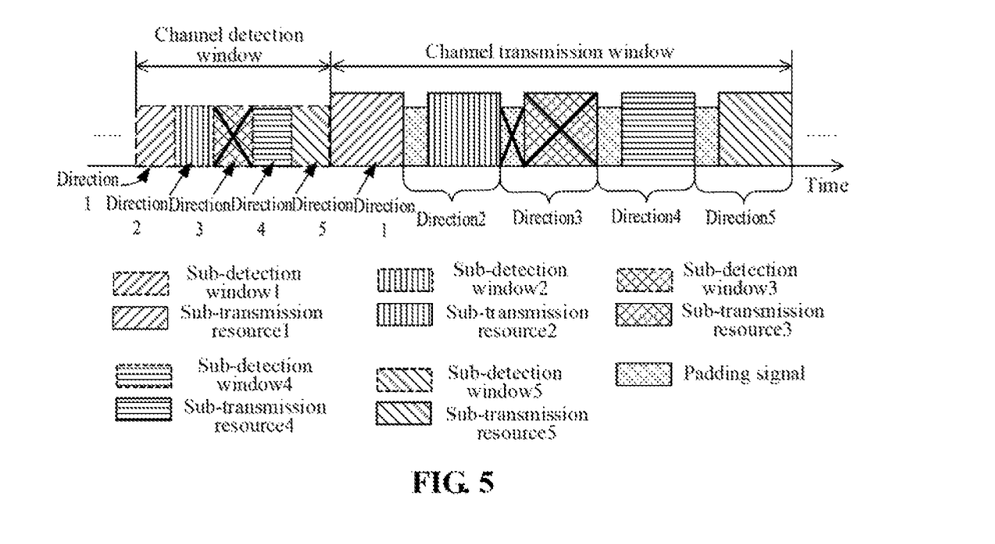
FIG. 5 is a schematic diagram of a channel detection window and a signal transmission window according to an embodiment of the disclosure.

For example, as shown in FIG. 5, taking M=N=5 as an example, the channel detection window is located before the channel transmission window, the channel detection window includes 5 sub-detection windows, the signal transmission window includes 5 sub-transmission resources, and 5 sub-detection windows have one-to-one correspondences with the 5 sub-transmission resources. The sub detection window 1 corresponds to the sub transmission resource 1, the sub detection window 2 corresponds to the sub transmission resource 2, the sub detection window 3 corresponds to the sub transmission resource 3, the sub detection window 4 corresponds to the sub transmission resource 4, and the sub detection window 5 corresponds to sub-transport resource 5. As shown in FIG. 5, the communication device performs channel detection in five sub-detection windows, assuming that results of the detection obtained after performing channel detection on sub-detection window 1, sub-detection window 2, sub-detection window 4, and sub-detection window 5 indicate that channels are idle, the result of the detection obtained after performing channel detection on the sub-detection window 3 indicates that the channel is occupied (shown by x), the communication device transmits a target signal on sub-transmission resources 1, sub-transmission resources 2, sub-transmission resources 4 and sub-transmission resources 5, instead of transmitting a target signal on sub-transmission resource 3.

Further, as shown in FIG. 5, if the sub-detection window 1 is used to perform channel detection on a channel in direction 1, the sub-detection window 2 is used to perform channel detection on a channel in direction 2, and the sub-detection window 3 is used to perform channel detection on a channel in direction 3, the sub-detection window 4 is used to perform channel detection on a channel in direction 4, and the sub-detection window 5 is used to perform channel detection on a channel in direction 5. The communication device performs channel detection on the sub-detection window 1, the sub-detection window 2, the sub-detection window 4 and the sub-detection window 5 and obtained results of the detection indicate that the channels are idle, the communication device transmits a target signal in the direction 1 (or a beam corresponding to direction 1) using sub-transmission resource 1, transmits a target signal in direction 2 (or a beam corresponding to direction 2) using sub-transmission resource 2, transmits a target signal in direction 4 (or a beam corresponding to direction 4) using sub-transmission resource 4, and transmits a target signal in direction 5 (or a beam corresponding to direction 5) using sub-transmission resource 5.

As shown in FIG. 5, there is a time interval between two adjacent sub-transmission resources, and the time interval can be used to transmit a padding signal, and the padding signal may be, for example, some noise signals, so as to occupy transmission resources in advance for subsequent transmission of the target signal. The padding signal and the target signal may use the same precoding. In addition, when a sub-detection window corresponding to a sub-transmission resource is used to perform channel detection in a certain direction, the padding signal before the sub-transmission resource is also transmitted in the direction. For example, the padding signal transmitted in a time interval between sub-transmission resource 1 and sub-transmission resource 2 is transmitted in direction 2 along with the target signal transmitted on the sub-transmission resource 2.

It should be illustrated that, without conflict, the embodiments described in the disclosure and/or the technical features in each embodiment can be arbitrarily combined with each other, and the technical solution obtained after the combination should also fall within the scope of protection of the disclosure.

It should be understood that in various embodiments of the present disclosure, the values of the sequence numbers of the above processes does not mean that an execution order, and an execution order of each process should be determined by the function and inherent logic thereof, and should not constitute a limit to the implementation process of the embodiments of the disclosure.

The communication method according to the embodiment of the disclosure is described in detail above. The device according to the embodiment of the disclosure will be described below in conjunction with FIG. 6 to FIG. 8. The technical features described in the method embodiment are applicable to the following device embodiments.

Figure 6:
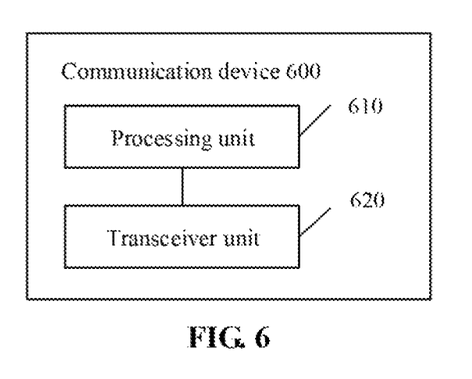
FIG. 6 is a schematic block diagram of a communication device according to an embodiment of the disclosure.

FIG. 6 is a schematic block diagram of a communication device 60 according to an embodiment of the disclosure. As shown in FIG. 6, the communication device 600 includes a processing unit 610 and a transceiver unit 620.

The processing unit 610 is configured to determine a channel detection window and a signal transmission window. The channel detection window is located before the signal transmission window in the time domain. The channel detection window includes N sub-detection windows, and the signal transmission window includes M sub-transmission resources. The first sub-detection window of the N sub-detection windows corresponds to the first sub-transmission resource of the M sub-transmission resources, N and M are positive integers and N≥2, M≥2.

The processing unit 610 is further configured to perform channel detection in the first sub-detection window.

The transceiver unit 620 is configured to transmit a target signal in the first sub-transmission resource in response to that a result of the channel detection in the first sub-detection window indicates that the channel is idle.

Since the channel detection window includes multiple sub-detection windows for respectively performing channel detection on multiple signals to be transmitted, and the communication device transmits multiple signals in corresponding sub-transmission resources in the signal transmission window after the channel detection window based on a result of the detection, thereby ensuring effective transmission of high-priority signals while ensuring fairly using spectrum resources by communication systems on the unlicensed frequency spectrum.

It can be seen that even if there is no time interval for channel detection between the transmission resources used by the multiple signals to be transmitted or the time interval is not enough to perform channel detection, the method described in the embodiments of the disclosure can still effectively realize effective channel detection for multiple consecutive signals.

Optionally, M=N, the first sub-detection window is an i-th sub-detection window arranged of the N sub-detection windows arranged in chronological order, and the first sub-transmission resource is an i-th sub-transmission resource of the M sub-transmission resources arranged in chronological order, i is a positive integer, and 1≤i≤N.

Optionally, M=N, the first sub-detection window is an i-th sub-detection window of the N sub-detection windows arranged in chronological order, and the first sub-transmission resource is an i-th sub-transmission resource of the M sub-transmissions resources arranged in reverse chronological order, i is a positive integer and 1≤i≤N.

Optionally, the N sub-detection windows are continuous in the time domain.

Optionally, the M sub-transmission resources further include a second sub-transmission resource adjacent to the first sub-transmission resource, and the first sub-transmission resource and the second sub-transmission resource are continuous or discontinuous in the time domain.

Optionally, the first sub-transmission resource and the second sub-transmission resource are discontinuous in the time domain, and the second sub-transmission resource is located before the first sub-transmission resource in the time domain, the transceiver unit 620 is further configured to transmit a padding signal in a time interval between the second sub-transmission resource and the first sub-transmission resource. The padding signal and the target signal use the same precoding.

Optionally, the processing unit 610 is configured to perform channel detection on a channel in a first direction within the first sub-detection window. The transceiver unit 620 is configured to transmit a target signal in the first direction in the first sub-transmission resource in response to that a result of the channel detection on the channel in the first direction within the first sub-detection window indicates that the channel is idle.

Optionally, if the result of the channel detection within the first sub-detection window indicates that the channel is occupied, the transceiver unit 620 does not transmit the target signal in the first sub-transmission resource.

Optionally, the target signal is one of signals as follows: a synchronization signal block SSB, a channel state indication reference signal CSI-RS, and a sounding reference signal SRS.

Optionally, the communication device is a network device or a terminal device.

It should be understood that the communication device 600 may perform the operations performed by the communication device in the above method 400, which is not described repeatedly here anymore for the sake of brevity.

Figure 7:
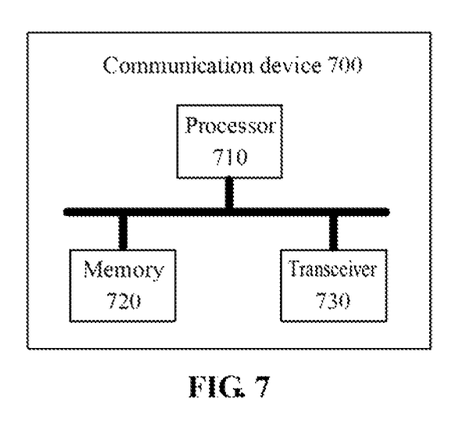
FIG. 7 is a schematic structural diagram of a communication device according to an embodiment of the disclosure.

FIG. 7 is a schematic structural diagram of a communication device 700 according to an embodiment of the disclosure. As shown in FIG. 7, the communication device includes a processor 710, and the processor 710 can call and run a computer program from a memory to implement the method in the embodiments of the disclosure.

Optionally, as shown in FIG. 7, the communication device 700 may further include a memory 720. The processor 710 can call and run a computer program from the memory 720 to implement the method in the embodiments of the disclosure.

The memory 720 may be a separate device independent of the processor 710, or may be integrated in the processor 710.

Optionally, as shown in FIG. 7, the communication device 700 may further include a transceiver 730, and the processor 710 may control the transceiver 730 to communicate with other devices. The processor 710 may control the transceiver 730 to send information or data to other devices, or receive information or data sent by other device.

The transceiver 730 may include a transmitter and a receiver. The transceiver 730 may further include antennas, and the number of antennas may be one or more.

Optionally, the communication device 700 may be a network device according to an embodiment of the disclosure, and the communication device 700 may implement the corresponding processes implemented by the network device in each method of the embodiment of the disclosure, which are not described repeatedly herein for clarity.

Optionally, the communication device 700 may be a terminal device according to an embodiment of the disclosure, and the communication device 700 may implement the corresponding processes implemented by the terminal device in each method of the embodiment of the disclosure, which are not described repeatedly herein for clarity.

Figure 8:
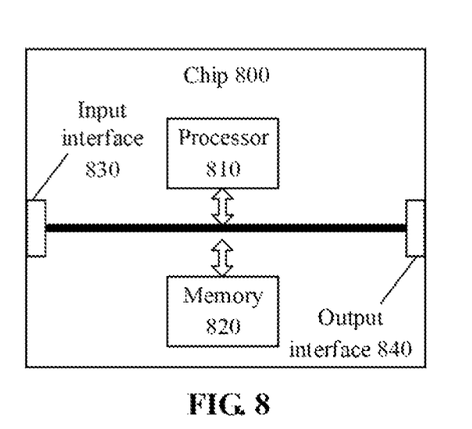
FIG. 8 is a schematic structural diagram of a chip according to an embodiment of the disclosure.

FIG. 8 is a schematic structural diagram of a chip according to an embodiment of the disclosure. The chip 800 shown in FIG. 8 includes a processor 810, and the processor 810 may call and run a computer program from a memory to implement the method in the embodiment of the disclosure.

The memory 820 may be a separate device independent of the processor 810, or may be integrated in the processor 810.

Optionally, the chip 800 may further include an input interface 830. The processor 810 can control the input interface 830 to communicate with other devices or chips. The processor 810 may control the input interface 830 to obtain information or data sent by other devices or chips.

Optionally, the chip 800 may further include an output interface 840. The processor 810 can control the output interface 84 to communicate with other devices or chips.

The processor 810 may control the output interface 840 to output information or data to other devices or chips.

Optionally, the chip may be applied to the network device in the embodiment of the disclosure, and the chip may implement the corresponding processes implemented by the network device in each method of the embodiment of the disclosure, which are not described repeatedly herein for clarity.

Optionally, the chip may be applied to the terminal device in the embodiment of the disclosure, and the chip can implement the corresponding processes implemented by the terminal device in each method of the embodiment of the disclosure, which are not described repeatedly herein for clarity.

It should be understood that the chips in the embodiments of the disclosure may also be referred to as system-on-chips, system chips, chip systems, or system-on-chip chips.

The processor described above may be a general-purpose processor, a digital signal processor (DSP), a field programmable gate array (FPGA), an application specific integrated circuit (ASIC), or other programmable logic devices, transistor logic devices, discrete hardware components etc. The aforementioned general-purpose processor may be a microprocessor or any conventional processor, etc.

The memory described above may be a volatile memory or a non-volatile memory, or may include both the volatile memory and the non-volatile memory. The non-volatile memory may be a read-only memory (ROM), a programmable ROM (PROM), an erasable PROM, (EPROM), an electronically EPROM (EEPROM) or a flash memory. The volatile memory may be a random access memory (RAM).

It should be understood that the foregoing memory is exemplary but not restricted. For example, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SL-DRAM) and a direct rambus RAM (DR RAM) or the like. That is to say, the memory in the embodiments of the disclosure is intended to include but is not limited to these and any other suitable types of memories.

It should be understood that in the embodiment of the disclosure, "B corresponding to A" means that B is associated with A, and B can be determined according to A. However, it also should be understood that determining B based on A does not mean determining B only based on A, and may also mean determining B based on A and/or other information.

Those of ordinary skill in the art may realize that units and algorithm steps of the examples described in conjunction with the embodiments disclosed herein may be implemented by electronic hardware or a combination of computer software and electronic hardware. Whether the functions are executed in hardware or software depends on a specific application and design constraints of the technical solution. Professional technicians can use different methods to implement the described functions for each specific application, but such implementation should not be considered beyond the scope of the disclosure.

Those skilled in the art can clearly understand that, for the convenience and conciseness of the description, regarding specific operation processes of the system, device and unit described above, reference may be made to the corresponding processes in the foregoing method embodiments, which are not be repeated here.

In the several embodiments provided in the disclosure, it should be understood that the disclosed system, device, and method may be implemented in other ways. For example, the device embodiments described above are only schematic. For example, the division of the unit is only a division of logical functions. In actual implementation, there may be another division manner, for example, multiple units or components may be combined or may integrated into another system, or some features can be ignored, or not implemented. In addition, the displayed or discussed mutual coupling or direct coupling or communication connection may be indirect coupling or communication connection through some interfaces, devices or units, and may be in electrical, mechanical or other forms.

The units described as separate components may be or may not be physically separated, and the components displayed as units may be or may not be physical units, that is, the components may be located in one place, or may be distributed in multiple network units, a part or all of the units may be selected according to actual needs to achieve the purpose of the solution of this embodiment.

In addition, the functional units in each embodiment of the disclosure may be integrated into one processing unit, or each unit may exist alone physically, or two or more units may be integrated into one unit.

If the functions are implemented in the form of software functional units and sold or used as independent products, the functions can be stored in a computer-readable storage medium. Based on such an understanding, the essential parts of the technical solutions of the disclosure, or parts of the technical solutions of the disclosure making contributions to the conventional art, or part of the technical solution of the disclosure may be embodied in form of software product, and the computer software product is stored in a storage medium, and includes several instructions configured to enable a computer device (which may be a personal computer, a server, a network device or the like) to execute all or a part of the method in each embodiment of the disclosure. The above storage medium includes: various media capable of storing program codes such as a U disk, a mobile hard disk, a Read Only Memory (ROM), a random access memory (RAM), a magnetic disk or an optical disk.

The foregoing is only the specific embodiments of the disclosure and not intended to limit the scope of protection of the disclosure. Any variations or replacements apparent to those skilled in the art within the technical scope disclosed by the disclosure shall fall within the scope of protection of the disclosure. The scope of protection of the disclosure should conform to the scope of protection of the claims.

The invention claimed is:

1. A method for signal transmission, comprising:
   determining a channel detection window and a signal transmission window, the channel detection window being located before the signal transmission window in time domain wherein the channel detection window comprises N sub-detection windows, and the signal transmission window comprises sub-transmission resources, a first sub-detection window of the N sub-detection windows corresponds to a first sub-transmission resource of the NI sub-transmission resources, N and M are positive integers, N≥2 and M≥2;
   performing channel detection in the first sub-detection window; and
   transmitting a target signal in the first sub-transmission resource in response to that a result of the channel detection in the first sub-detection window indicates that a channel is idle,
   wherein the N sub-detection windows are continuous in the time domain.

2. The method of claim 1, wherein M=N, the first sub-detection window is an i-th sub-detection window of the N sub-detection windows arranged in chronological order, the first sub-transmission resource is an i-th sub-transmission resource of the M sub-transmission resources arranged in chronological order, i is a positive integer, and $1 \leq i \leq N$.

3. The method of claim 1, wherein the first sub-detection window is an i-th sub-detection window of the N sub-detection windows arranged in chronological order, and the first sub-transmission resource is an i-th sub-transmission resource of the M sub-transmission resources arranged in reverse chronological order, i is a positive integer and $1 \leq i \leq N$.

4. The method of claim 1, wherein the M sub-transmission resources comprises a second sub-transmission resource adjacent to the first sub-transmission resource, and the first sub-transmission resource and the second sub-transmission resource are continuous or discontinuous in the time domain.

5. The method of claim 4, wherein the first sub-transmission resource and the second sub-transmission resource are discontinuous in the time domain, and the second sub-transmission resource is located before the first sub-transmission resource in the time domain, the method further comprises:
transmitting a padding signal in a time interval between the second sub-transmission resource and the first sub-transmission resource, wherein the padding signal and the target signal use a same precoding.

6. The method of claim 1, wherein the performing channel detection in the first sub-detection window comprises:
performing channel detection on a channel in a first direction in the first sub-detection window;
the transmitting the target signal in the first sub-transmission resource in response to that a result of the channel detection in the first sub-detection window indicates that the channel is idle comprises:
transmitting the target signal on the first sub-transmission resource in the first direction in response to that a result of the channel detection on the channel in the first direction in the first sub-detection window indicates that the channel is idle.

7. The method of claim 1, wherein the target signal is not transmitted in the first sub-transmission resource in response to that the result of the channel detection in the first sub-detection window indicates that the channel is occupied.

8. The method of claim 1, wherein the target signal is one of signals as follows:
a synchronization signal block SSB, a channel state indication reference signal CSI-RS and a sounding reference signal SRS.

9. The method of claim 1, wherein the method for signal transmission is performed by a network device or a terminal device.

10. A communication device, comprising a processor, wherein the processor is configured to call instructions stored in a memory to implement:
determining a channel detection window and a signal transmission window, the channel detection window being located before the signal transmission window in time domain, wherein the channel detection window comprises N sub-detection windows, and the signal transmission window comprises M sub-transmission resources, a first sub-detection window of the N sub-detection windows corresponds to a first sub-transmission resource of the M sub-transmission resources, N and M are positive integers, $N \geq 2$ and $M \geq 2$;
performing channel detection in the first sub-detection window; and
transmitting a target signal in the first sub-transmission resource in response to that a result of the channel detection in the first sub-detection window indicates that a channel is idle,
wherein the N sub-detection windows are continuous in the time domain.

11. The communication device of claim 10, wherein M=N, the first sub-detection window is an i-th sub-detection window of the N sub-detection windows arranged in chronological order, the first sub-transmission resource is an i-th sub-transmission resource of the M sub-transmission resources arranged in chronological order, i is a positive integer, and $1 \leq i \leq N$.

12. The communication device of claim 10, wherein the first sub-detection window is an i-th sub-detection window of the N sub-detection windows arranged in chronological order, and the first sub-transmission resource is an i-th sub-transmission resource of the M sub-transmission resources arranged in reverse chronological order, i is a positive integer and $1 \leq i \leq N$.

13. The communication device of claim 10, wherein the M sub-transmission resources comprises a second sub-transmission resource adjacent to the first sub-transmission resource, and the first sub-transmission resource and the second sub-transmission resource are continuous or discontinuous in the time domain.

14. The communication device of claim 13, wherein the first sub-transmission resource and the second sub-transmission resource are discontinuous in the time domain, and the second sub-transmission resource is located before the first sub-transmission resource in the time domain, the processor is further configured to call the instructions stored in the memory to implement:
transmitting a padding signal in a time interval between the second sub-transmission resource and the first sub-transmission resource, wherein the padding signal and the target signal use a same precoding.

15. The communication device of claim 10, wherein the processor is further configured to call the instructions stored in the memory to implement:
performing channel detection on a channel in a first direction in the first sub-detection window,
wherein the processor is further configured to call the instructions stored in the memory to implement:
transmitting the target signal on the first sub-transmission resource in the first direction in response to that a result of the channel detection on the channel in the first direction in the first sub-detection window indicates that the channel is idle.

16. The communication device of claim 10, wherein the target signal is not transmitted in the first sub-transmission resource in response to that the result of the channel detection in the first sub-detection window indicates that the channel is occupied.

17. The communication device of claim 10, wherein the target signal is one of signals as follows:
a synchronization signal block SSB, a channel state indication reference signal CSI-RS and a sounding reference signal SRS.

18. A non-transitory computer-readable storage medium having stored thereon a computer program, wherein the computer program, when executed by a computing device, enables the storage medium to implement:
determining a channel detection window and a signal transmission window, the channel detection window being located before the signal transmission window in time domain wherein the channel detection window comprises N sub-detection windows, and the signal transmission window comprises M sub-transmission resources, a first sub-detection window of the N sub-detection windows corresponds to a first sub-transmission resource of the M sub-transmission resources, N and M are positive integers, N≥2 and M≥2;

performing channel detection in the first sub-detection window; and transmitting a target signal in the first sub-transmission resource in response to that a result of the channel detection in the first sub-detection window indicates that a channel is idle, wherein the N sub-detection windows are continuous in the time domain.

* * * * *